(12) United States Patent
Hong

(10) Patent No.: US 6,505,872 B2
(45) Date of Patent: Jan. 14, 2003

(54) INSTALLATION STRUCTURE OF MID-GATE OF SPORT UTILITY TRUCK

(75) Inventor: Sung Chan Hong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/000,075

(22) Filed: Dec. 4, 2001

(65) Prior Publication Data

US 2002/0079715 A1 Jun. 27, 2002

(30) Foreign Application Priority Data

Dec. 21, 2000 (KR) .............................. 00-79813

(51) Int. Cl.⁷ ................................................ B60P 3/34
(52) U.S. Cl. ................ 296/26.11; 296/190.11; 296/39.2; 296/37.16
(58) Field of Search .................... 296/26.11, 26.08, 296/26.01, 39.1, 39.2, 191, 37.16, 190.08, 190.1, 190.11, 51

(56) References Cited

U.S. PATENT DOCUMENTS

| 4,480,868 A | * | 11/1984 | Koto | 296/190.11 |
| 4,941,702 A | * | 7/1990 | Southward | 296/190.11 |
| 4,958,876 A | * | 9/1990 | Diaco et al. | 296/39.2 |
| D336,062 S | * | 6/1993 | Austin | 296/39.1 |
| 5,240,301 A | * | 8/1993 | Arnold | 296/39.2 |
| 5,265,993 A | * | 11/1993 | Wayne | 296/39.2 |
| 5,492,257 A | * | 2/1996 | Demick | 296/37.16 |
| 5,531,497 A | * | 7/1996 | Cheng | 296/39.2 |
| 5,934,727 A | * | 8/1999 | Storc et al. | 296/26.11 |
| 6,120,076 A | * | 9/2000 | Adsit et al. | 296/26.11 |
| 6,176,535 B1 | * | 1/2001 | Chaloult et al. | 296/26.08 |
| 6,186,575 B1 | * | 2/2001 | Fisher et al. | 296/26.09 |
| 6,260,916 B1 | * | 7/2001 | Hunt | 296/26.11 |
| 6,276,751 B1 | * | 8/2001 | Ikarashi et al. | 296/190.11 |
| 6,290,277 B1 | * | 9/2001 | Spykeman et al. | 296/37.16 |
| 6,364,391 B1 | * | 4/2002 | Everett | 296/51 |
| 6,398,291 B1 | * | 6/2002 | Reusswig et al. | 296/26.11 |
| 2001/0030448 A1 | * | 10/2001 | Wilson | 296/190.11 |
| 2002/0070573 A1 | * | 6/2002 | Song | 296/26.11 |

FOREIGN PATENT DOCUMENTS

JP            58 30877        *  2/1983

* cited by examiner

Primary Examiner—Kiran Patel
(74) Attorney, Agent, or Firm—Antonelli, Terry, Stout & Kraus, LLP.

(57) ABSTRACT

An installation structure of a mid-gate of a sport utility truck that can significantly secure stability and strength of a part where a mid-gate is mounted onto a vehicle body, the structure including: a rear floor panel; a deck floor panel positioned with a predetermined interval over the rear floor panel; a closing panel directly connecting the front portion of the deck floor panel with the rear floor panel; and a mid-gate mounting panel with its rear end being connected with the closing panel, its front end being connected with the rear floor panel and a mid-gate hinge being fixed at its upper surface, thereby reinforcing the mid-gate installed part and restricting the occurrence of twists at the rear cargo loading portion of the vehicle body.

2 Claims, 5 Drawing Sheets

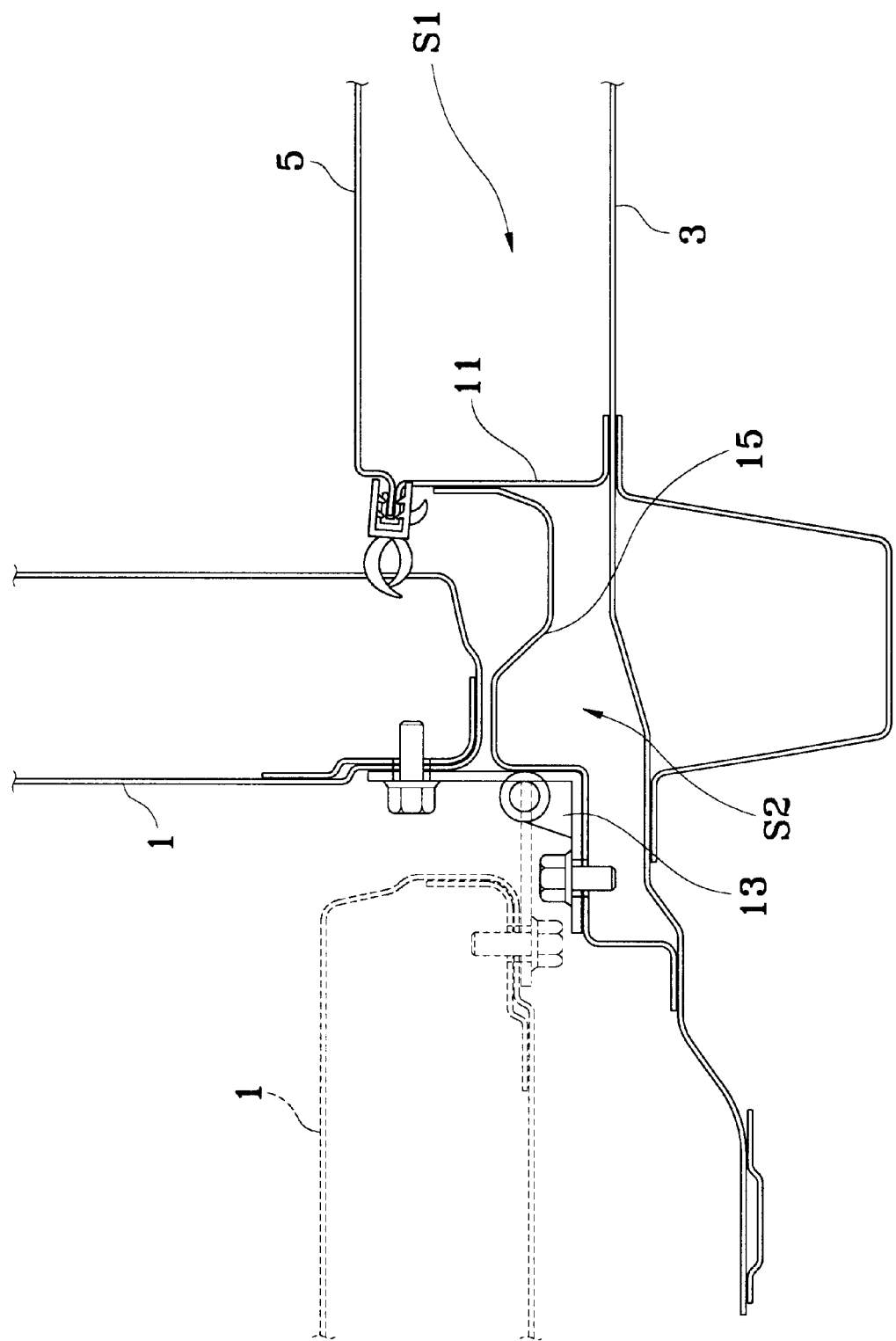

INSTALLATION STRUCTURE OF MID-GATE OF SPORT UTILITY TRUCK

BACKGROUND OF THE INVENTION

1. Field of the Invention

The present invention relates to an installation structure of a mid-gate provided for securing a cargo loading space in the sport utility truck that can combine a passenger portion of an automobile and practicality of a pickup truck, and more particularly to an installation structure of a mid-gate that can secure a part of a vehicle body to install the mid-gate and reinforce strength of the part.

2. Brief Description of the Related Art

In general, a conventional vehicle that has a mid-gate to distinguish a passenger portion and a cargo loading portion, as shown in FIGS. 1 and 2, can shut or open the front passenger portion and the rear cargo loading portion of a vehicle body with the mid-gate. The installation structure of the mid-gate 100, as shown in FIG. 3, is constructed to rotatively support the mid-gate 100 with a hinge bracket 104 at a rear floor panel 102 of a vehicle body in a simple structure.

In the structure where a mid-gate 100 is constructed with a simple hinge bracket 104 at the single rear floor panel 102 of the vehicle body as described above, the gravitational weight of the mid-gate 100 and the weight of cargo at the cargo loading part are interacted, and the rear portion of the vehicle is easily twisted by the weight of the loaded cargo to readily deform the installation part of the hinge bracket 104, thereby causing a problem of deteriorating its strength.

If the installation part of the hinge bracket 104 is readily deformed, there are problems that the mid-gate 100 may not be easily opened or closed and that noise generates.

SUMMARY OF THE INVENTION

It is an object of the present invention to solve the aforementioned problems and provide an installation structure of a mid-gate of a sport utility truck that can secure a stable and strong installation structure of a mid-gate by reinforcing a part where the mid-gate is mounted and by restricting the occurrence of twists at the rear cargo loading portion of the vehicle body to the maximum.

In order to accomplish the aforementioned object of the present invention, there is provided an installation structure of a mid-gate of a sport utility truck, the structure comprising:

a rear floor panel;

a deck floor panel positioned with a predetermined interval over the rear floor panel;

a closing panel directly connecting the front portion of the deck floor panel with the rear floor panel; and a mid-gate mounting panel whose a rear end is connected with the closing panel, a front end is connected with the rear floor panel and an upper surface is provided with a mid-gate hinge.

BRIEF DESCRIPTION OF THE DRAWINGS

For fuller understanding of the nature and object of the invention, reference should be made to the following detailed description taken in conjunction with the accompanying drawings in which:

FIG. 7 is a cross-sectional, perspective view for illustrating an enlarged part where a mid-gate is installed in accordance with the present invention.

DETAILED DESCRIPTION OF THE INVENTION

Hereinafter, a preferred embodiment of the present invention will be described in detail with reference to accompanying drawings.

As shown in FIGS. 4 through 7 illustrate an installation structure of a mid-gate of a sport utility truck in accordance with the present invention.

Figure 1:
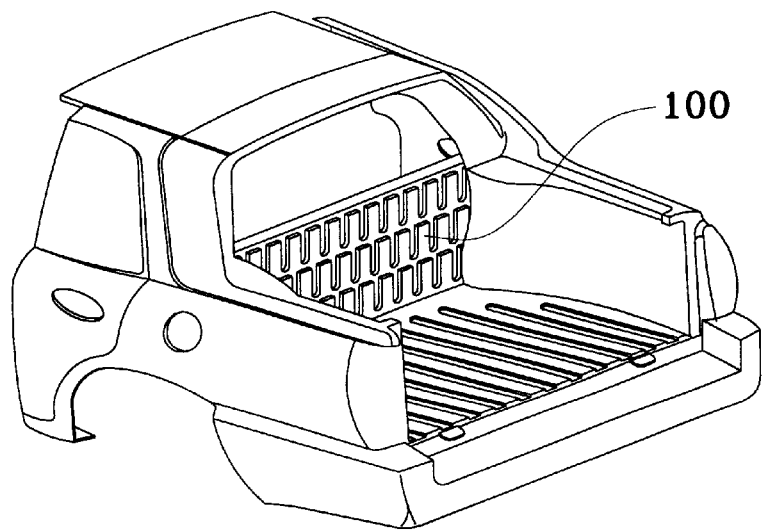
FIG. 1 illustrates a close state of a mid-gate of a general vehicle.
Figure 2:
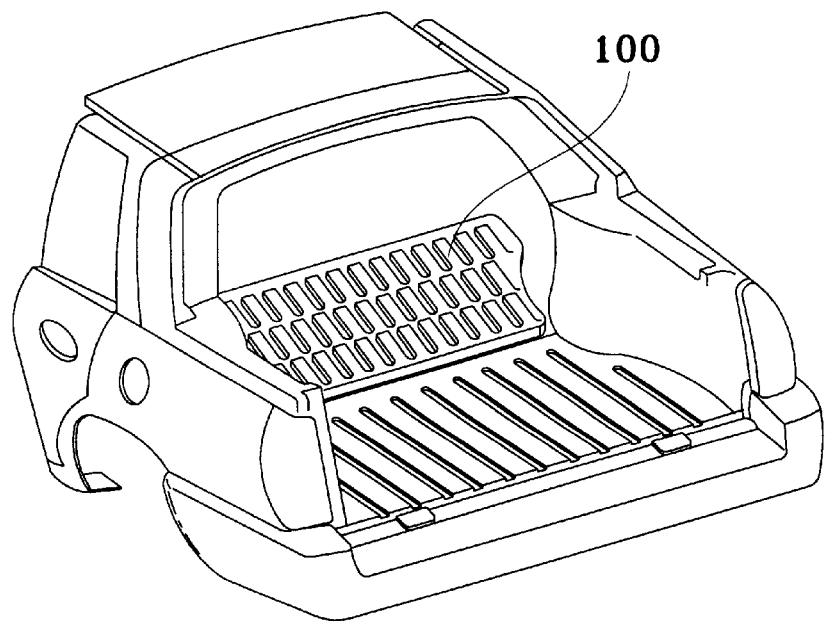
FIG. 2 illustrates an open state of the mid-gate shown in FIG. 1.
Figure 3:
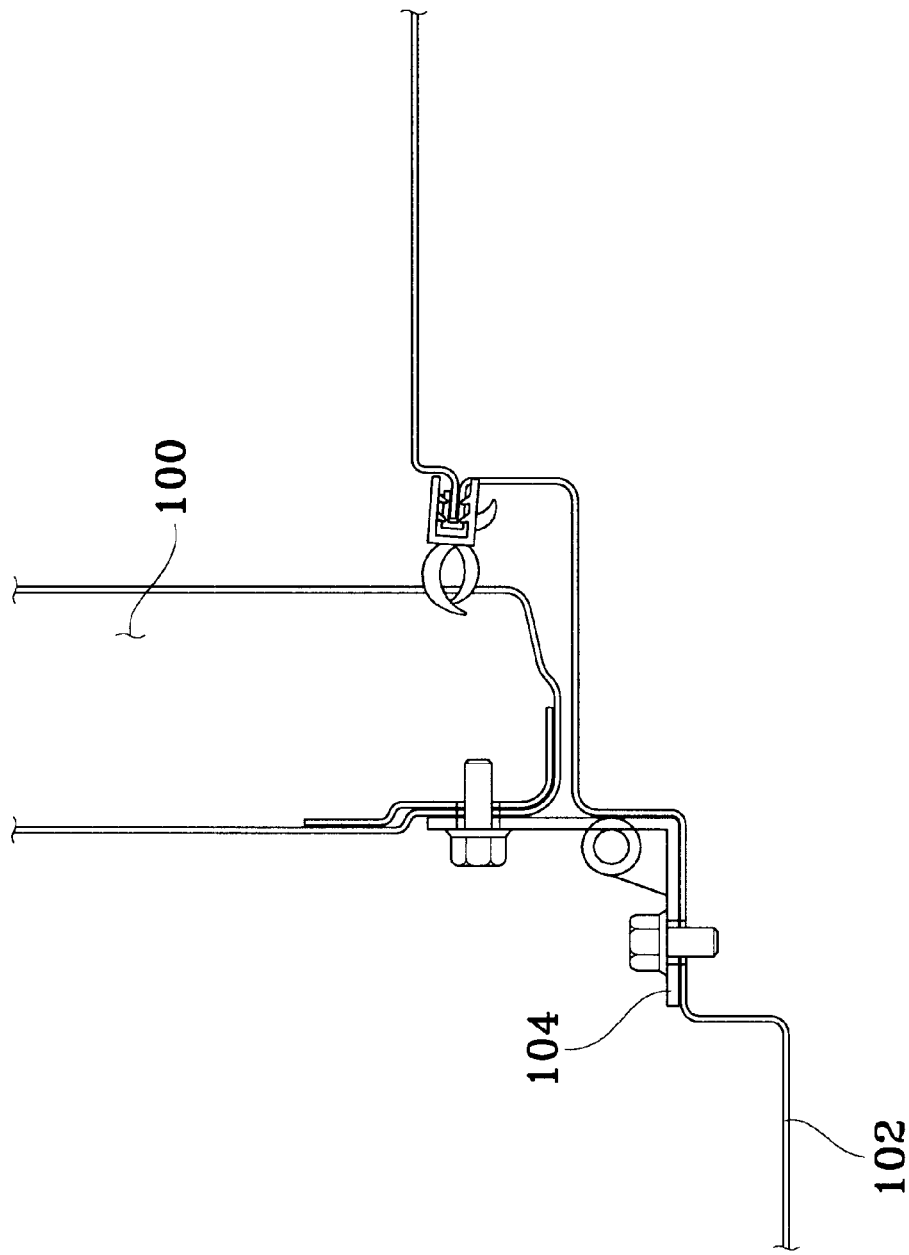
FIG. 3 is a structural view for illustrating an installation structure of a mid-gate according to the prior art.
Figure 4:
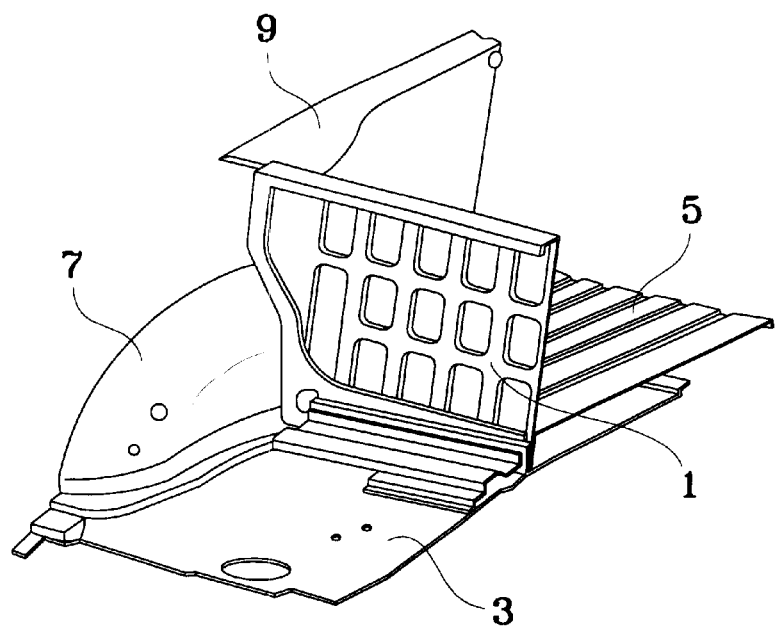
FIG. 4 is a perspective view for illustrating an installation structure of a mid-gate in accordance with the present invention.
Figure 5:
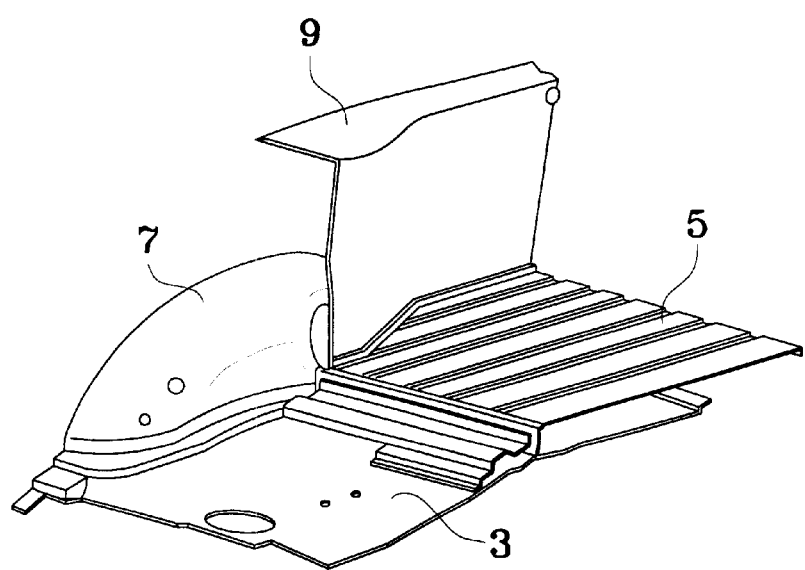
FIG. 5 is a perspective view for illustrating a state where a mid-gate is removed from FIG. 4.
Figure 6:
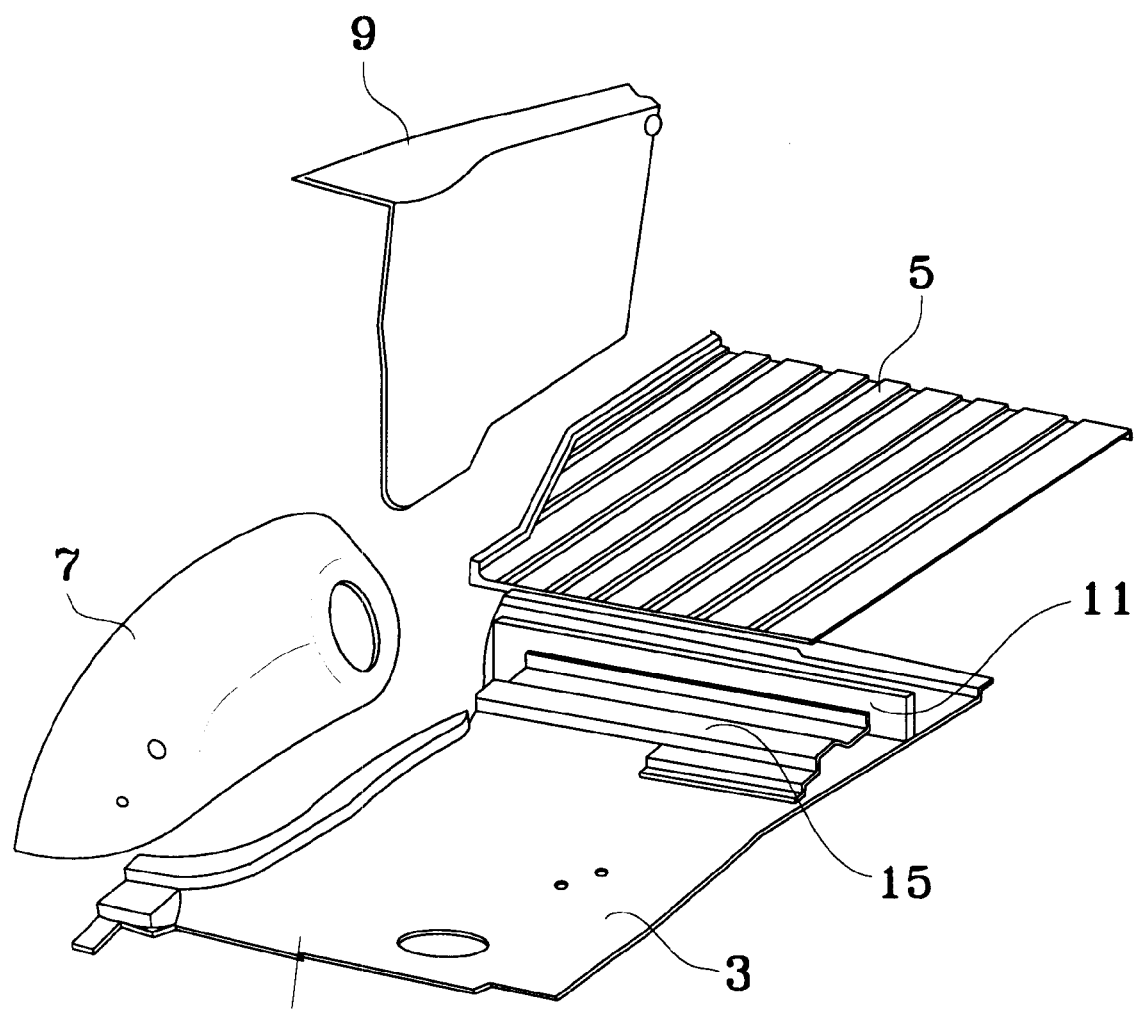
FIG. 6 is an exploded, perspective view of FIG. 5.

FIGS. 4 through 6 three-dimensional illustrate the assembly of periphery parts around the mid-gate 1, largely comprising a rear floor panel 3, a deck floor panel 5, rear wheel side panel 7, a deck side panel 9 and mid-gate 1 in an inter-connected structure.

In other words, the rear floor panel 3 and the deck floor panel 5 are installed in parallel with a predetermined space S1, and the deck side panels 9 are connected at both sides of the deck floor panel 5, thereby forming a cargo loading space. Besides, the rear wheel side panels 7 are connected at both sides of the rear floor panel 3.

At this time, the deck floor panel 5 is installed with a predetermined space over the rear floor panel 3, for which the front side of the deck floor panel 5 toward a vehicle body is connected with the rear floor panel 3 by a closing panel 11 as clearly shown in FIG. 7. Also, the predetermined space S1 formed between the deck floor panel 5 and the rear floor panel 3 is shut with the closing panel 11.

At this time, the closing panel 11 is longitudinally formed along the horizontal direction of the vehicle body, so that the front portion of the deck floor panel 5 toward the front side of the vehicle body is connected with the rear floor panel 3. In addition, a plurality of members not shown in the drawings are connected at the front and rear sides of the deck floor panel 6 and rear floor panel 3 in a general method to maintain the predetermined space S1 formed between the deck and rear floor panels 5, 3. As a result, the periphery members around the predetermined space S1 has a greater strength against a twisting load due to their structural interaction, thereby achieving an effect of significantly reinforcing strength of the deck and rear floor panels 5, 3 against twists.

On the other hand, the mid-gate 1 has its rear end connected to the closing panel 11 and its front end connected to the rear floor panel 3, being installed at the vehicle body by a mid-gate mounting panel 15 which has a mid-gate hinge 13 fixed at its upper surface.

At this time, the mid-gate mounting panel 15 is, as shown in FIG. 7, constructed in a structure where a flat surface is formed to firmly fix the mid-gate hinge 13 and a plurality of bends are formed to secure the smoothness of opening and closing operations of the mid-gate 1. At this time, such bends can reinforce the structural strength of the mid-gate mounting panel 15 itself to minimize an unnecessary deformation by external force. In order to increase the strength of the structure as such, both ends of the mid-gate mounting panel 15 are also connected and fixed with the deck side panel 9. As a result, a space S2 is formed between the mid-gate mounting panel 15 and the rear floor panel 3. In other words, the spaces S1, S2 formed at the front and rear of the closing panel 11 enable its surrounding members to have a structurally strong feature.

Therefore, the mid-gate 1 is installed by a mid-gate hinge 13 at the mid-gate mounting panel 15 to achieve stability and durability of the structure.

As described above, there are advantages in the present invention in that the structure of mounting the mid-gate onto the vehicle body is reinforced to restrain the possibility of twists at the cargo loading space in the rear of the vehicle body, thereby securing a stable, and durable installation state of a mid-gate.

What is claimed is:

1. An installation structure of a mid-gate of a sport utility truck comprising:

a rear floor panel;

a deck floor panel positioned with a predetermined interval over the rear floor panel;

a closing panel directly connecting the front portion of the deck floor panel with the rear floor panel; and a mid-gate mounting panel whose rear end is connected with the closing panel, a front end is connected with the rear floor panel and an upper surface is provided with a mid-gate hinge.

2. The structure, as defined in claim 1, wherein the mid-gate mounting panel has both ends connected with a deck side panel.

* * * * *